United States Patent
Atmur

(10) Patent No.: US 10,256,757 B1
(45) Date of Patent: Apr. 9, 2019

(54) APPARATUS AND METHODS TO DAMP ELECTROMECHANICAL DEVICE VIBRATION

(75) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 1367 days.

(21) Appl. No.: 13/472,176

(22) Filed: May 15, 2012

(51) Int. Cl.
*H02P 8/32* (2006.01)

(52) U.S. Cl.
CPC ..................... *H02P 8/32* (2013.01)

(58) Field of Classification Search
CPC ............. H02P 8/32; H02P 21/05; H02P 23/04
USPC ......................................... 318/702, 114, 460
See application file for complete search history.

(56) References Cited

U.S. PATENT DOCUMENTS

| | | | | |
|---|---|---|---|---|
| 4,206,395 A * | 6/1980 | Okuyama | ............... | H02P 25/26 318/716 |
| 4,450,399 A * | 5/1984 | Tanaka | ........................... | 318/814 |
| 4,623,830 A * | 11/1986 | Peneder et al. | ................ | 318/798 |
| 4,803,483 A * | 2/1989 | Vandervier et al. | ....... | 340/853.2 |
| 5,857,060 A * | 1/1999 | Elliott et al. | ................... | 388/804 |
| 6,008,561 A * | 12/1999 | Tang | .............................. | 310/183 |
| 6,583,598 B2 * | 6/2003 | Raith et al. | .................... | 318/702 |
| 6,926,288 B2 * | 8/2005 | Bender | ................ | B60G 17/015 188/267 |
| 7,109,679 B2 | 9/2006 | Edson et al. | | |
| 8,237,384 B2 * | 8/2012 | Tarnow et al. | ............... | 318/375 |
| 2005/0200328 A1 | 9/2005 | Edson et al. | | |
| 2007/0241702 A1* | 10/2007 | Youkai et al. | ................ | 318/254 |

OTHER PUBLICATIONS

Mayergoyz, I. et al., "Basic Electric Circuit Theory" Academic Press, 1997, San Diego, CA, pp. 381, 382, 422, 5 pages (includes front cover, copyright page, and cited pp. 381, 382, 422).
Peter A. Stark, "Band Pass Filters and Resonance," (2004), available at http://www.users.cloud9.net/~stark/elchap21.pdf (last accessed May 20, 2016), 8 pages.
"Sound Engineering, Equalizer", available at http://home.online.no/~jaeioluf/sound/eqpassiv.htm (last accessed Apr. 16, 2015), 9 pages.

* cited by examiner

*Primary Examiner* — Bickey Dhakal
(74) *Attorney, Agent, or Firm* — Hanley, Flight and Zimmerman, LLC

(57) ABSTRACT

Apparatus and methods to damp electromechanical device vibration are disclosed. An example apparatus includes a damping filter to be coupled between terminals of an electromechanical device. The damping filter is to enable damping of non-control signal frequencies, and to not enable damping of control signal frequencies.

19 Claims, 8 Drawing Sheets

US 10,256,757 B1

APPARATUS AND METHODS TO DAMP ELECTROMECHANICAL DEVICE VIBRATION

BACKGROUND

Electromechanical devices such as electric motors and electromagnetic actuators are used to provide mechanical energy to mechanical systems. Such devices are used in the aerospace industry to control systems such as nose gear steering and wing configuration, where the systems are subject to significant noise and/or vibration levels. However, electric motors and electromagnetic actuators are present in a wide array of industries where vibration and noise are undesirable.

Known methods of controlling vibration modes in an electromechanical device include attempting to reduce or counter the vibration using the control system of the electromechanical device. For instance, in some known devices, the control system monitors the vibration and attempts to control the motor to counter the vibration. However, in these systems, the control frequencies are often insufficient to control the vibration frequencies. Furthermore, such control systems can require significant additional power to counter vibration.

Accordingly, there is a need for damping methods that do not interfere with control signals and do not require additional energy to operate. There is a further need for inexpensive damping methods and apparatus that can be easily installed.

SUMMARY

Example apparatus disclosed herein include a damping filter to be coupled between terminals of an electromechanical device. The damping filter is to enable damping of non-control signal frequencies or a range thereof and is to not enable damping of control signal frequencies or a range thereof.

A disclosed example system includes an electromechanical device, a control system to control a state of the electromechanical device, a shorting coil to provide a damping response for the electromechanical device, and a damping filter. The example damping filter is in series with the shorting coil and is to control a range of frequencies for the shorting coil damping response.

A disclosed example method includes electrically coupling a passive filter in series with a shorting coil between terminals of an electromechanical device. The passive filter circuit is configured to enable damping of non-control frequencies (or a range thereof) and to not enable damping of control frequencies (or a range thereof) of the shorting coil.

The features, functions, and advantages that have been discussed can be achieved independently in various embodiments or may be combined in yet other embodiments, further details of which can be seen with reference to the following description and drawings.

Figure 1:
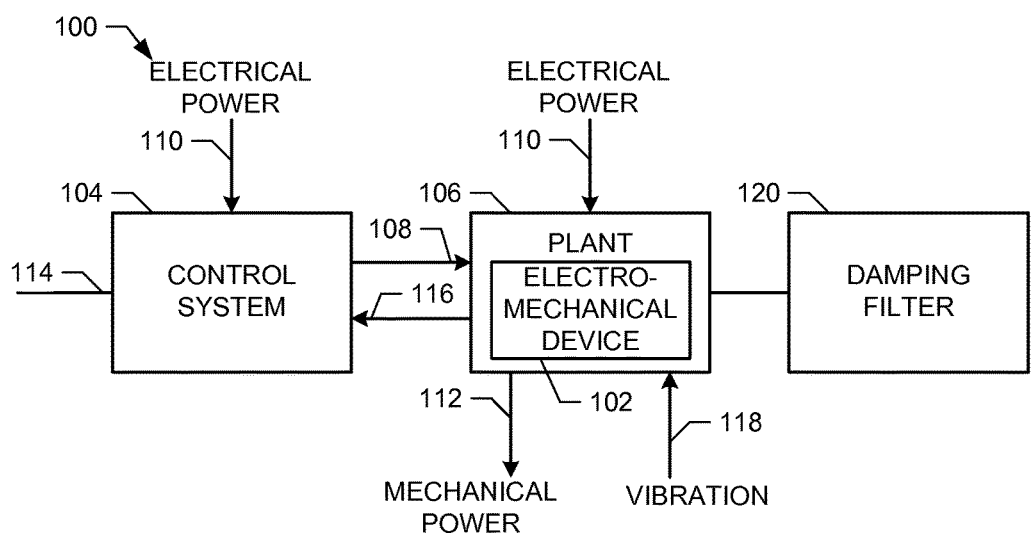
FIG. 1 is a block diagram of an example system to control an electromechanical device.

To clarify multiple layers and regions, the thicknesses of the layers are enlarged in the drawings. Accordingly, the structures illustrated in the drawings are not drawn to scale and, instead, are drawn to clarify the teachings of this disclosure. Wherever possible, the same reference numbers will be used throughout the drawing(s) and accompanying written description to refer to the same or like parts. As used in this disclosure, stating that any part (e.g., a layer, film, or area) is in any way positioned on (e.g., positioned on, located on, disposed on, attached to, or formed on, etc.) another part, means that the referenced part is either in contact with the other part, or that the referenced part is adjacent the other part with one or more intermediate part(s) located therebetween. Stating that any part is in contact with another part means that there is no intermediate part between the two parts.

DETAILED DESCRIPTION

Examples disclosed herein may be used to provide, enable, or limit damping to an electromechanical device. Example electromechanical devices that may benefit from such damping include electromagnetic actuators and electric motors. Disclosed example methods and apparatus include a filter to be electrically coupled in series with a shorting coil of the electromechanical device. Although shorting coils may be used alone to damp unwanted modes (e.g., vibration modes) of an electromechanical system, the shorting coils also cause undesirable damping of frequency ranges used to provide control signals to the electromechanical system. Example methods and apparatus disclosed herein advantageously limit the effective frequency range of a shorting coil to non-control frequencies or a range thereof.

In contrast to known methods and devices, example methods and apparatus disclosed herein may be implemented inexpensively and installed easily. Furthermore, example methods and apparatus may also be customized to damp one or more specific vibration modes (e.g., frequency ranges) after they are observed in the electromechanical device or a similar electromechanical device. Thus, example methods and apparatus provide advantageous damping characteristics without interfering with control systems or signals and require no additional energy to operate.

FIG. 1 is a block diagram of an example system 100 to control an electromechanical device 102. The example system 100 of FIG. 1 includes a control system 104 to control plant 106. The control system 104 includes, for example, speed and/or directional control to the plant 106. The plant 106 of the example of FIG. 1 includes the electromechanical device 102.

The example electromechanical device 102 of FIG. 1 may be, for example, an electromagnetic actuator or an electric motor. The electromechanical device accepts a control signal or signals 108 and electrical power 110 and generates mechanical power 112 based on the control signals 108 and the electrical power 110. The example control system 104 may also receive the electrical power 110 to generate the control signals 108.

The example control system 104 generates the control signals 108 to control the plant 106. In some examples, the control system 104 receives an input signal 114 to signal when and/or how the plant 106 is to be operated (e.g., forward, reverse, speed up, speed down, etc.). The control system 104 converts the input signal 114 to the control signal 108. The example control system 104 further receives a feedback signal 116 from the plant 106. The feedback signal 116 of FIG. 1 enables the control system 104 to perform closed-loop control (e.g., to control the plant 106 using the plant position, speed, mechanical power, etc. as feedback).

In operation, the plant 106 is subject to vibration(s) or vibration mode(s) 118 (e.g., from external forces acting on the plant 106). This vibration 118 is at least partially converted into transients (e.g., transient electrical signals) that affect the control signal 108, the electrical power 110, and/or the mechanical power 112, and is therefore undesirable. The example vibration 118 may include any one or more of an expected vibration mode, an expected noise mode, a measured vibration mode, or a measured noise mode, and/or any other measured and/or expected, or neither measured nor expected, mode that may be introduced into the system 100. To reduce (e.g., remove) the effects of the vibration 118 on the plant 106, the example system 100 of FIG. 1 includes a damping filter 120 electrically coupled to the plant 106. As described in more detail below, the damping filter 120 damps and/or enables damping of the vibrations 118 to reduce the effects of the vibration on the system 100.

Figure 2:
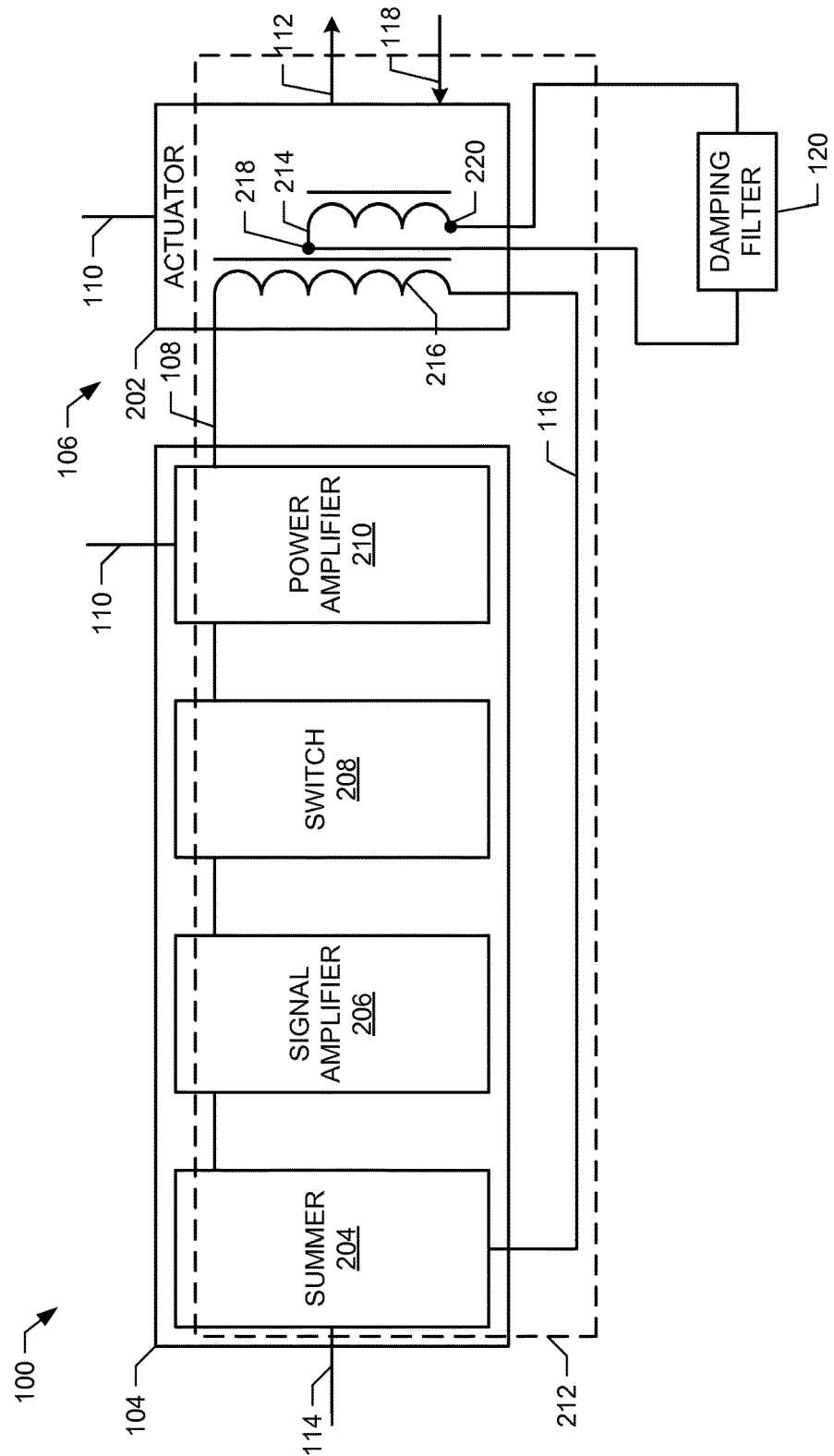
FIG. 2 is a schematic diagram of the system of FIG. 1.

FIG. 2 is a schematic diagram of the system 100 of FIG. 1. The example system 100 includes the control system 104, the plant 106 (including the electromechanical device 102 of FIG. 1 implemented using an actuator 202), and the damping filter 120 of FIG. 1. In the example of FIG. 2, the control system 104 includes a summer 204, a signal amplifier 206, a switch 208, and a power amplifier 210. The control system 104 outputs the control signal(s) 108 to the example actuator 202, which generates the mechanical power 112.

The example actuator 202 provides the feedback signal 116 to the control system 104 (e.g., to the summer 204). The summer 204 sums the feedback signal 116 with the input signal 114 (e.g., in a proportional-integral-derivative controller) and/or otherwise uses the feedback signal 116 to form a closed control loop 212.

The example system 100 further includes a shorting coil 214 to provide damping of the vibration 118. The shorting coil 214 of the illustrated example shorts (e.g., provides a shunt path to bypass) a winding 216 of the actuator 202. It should be understood that the shorting coil 214 does not necessarily provide a low or zero-impedance (i.e., an electrical short), but may instead be a shunt path having substantial (e.g., non-zero) resistance, inductance, and/or capacitance to alter the characteristics of the actuator 202 while the shorting coil 214 is in circuit (e.g., magnetic circuit) with the actuator 202. In the illustrated example, the shorting coil 214 includes terminals 218, 220 to which the damping filter 120 is connected in series. The shorting coil 214 is configured (e.g., designed) to have an amount of damping (e.g., a damping factor).

The example damping filter 120 of FIG. 2 is connected in circuit (e.g., in series) with the shorting coil 214 (e.g., at the terminals 218, 220). The damping filter 120 of the illustrated example controls (e.g., limits, establishes, effects) a range of frequencies for a damping response of the shorting coil. The effectiveness of the shorting coil 214 may be measured by comparing the damping factor ($\zeta$) to a threshold. If the damping factor $\zeta$ is greater than the threshold, the shorting coil 214 is considered effective. Conversely, if the damping factor $\zeta$ is less than the threshold, the shorting coil 214 is considered ineffective. The damping filter 120 controls frequency range(s) over which the shorting coil 214 is effective (e.g., the frequencies that are effectively shunted or damped) or ineffective (e.g., the frequencies that are functionally unaffected by the damping). Therefore, the damping filter 120 also controls the frequenc(ies) at which the shorting coil 214 becomes effective and/or ineffective. In some examples, the damping filter 120, in one state, enables damping of control and non-control frequencies, but is only triggered by sufficient vibration at non-control signal frequencies or a range thereof.

In the example of FIG. 2, the control system 104 generates the control signals 108 having lower frequencies than the vibration 118. The example damping filter 120 of FIGS. 1 and 2 enables damping of the vibration 118 while reducing (e.g., avoiding) damping of frequencies used by the control system 104.

The example shorting coil 214 and the example damping filter 120 may be implemented using the same or different circuits. For example, the shorting coil 214 and the damping filter 120 may be designed and/or constructed as the same circuit. In other examples, the shorting coil 214 is constructed separately from the damping filter 120. For example, the shorting coil 214 may be constructed and/or installed into the actuator 202 at a first time. The damping filter 120 may then be selected, designed, constructed, and/or installed in series with the shorting coil 214 at a later time based on observed and/or measured vibration mode(s) 118 and/or other undesired modes of the actuator 202. In this manner, the example damping filter 120 of FIGS. 1 and 2 is highly flexible in that an electromechanical device designer can reduce the importance given to expected vibration and/or noise reduction when designing the electromechanical device because a suitable damping filter can later be designed and installed into the electromechanical device with very low cost.

Figure 3:
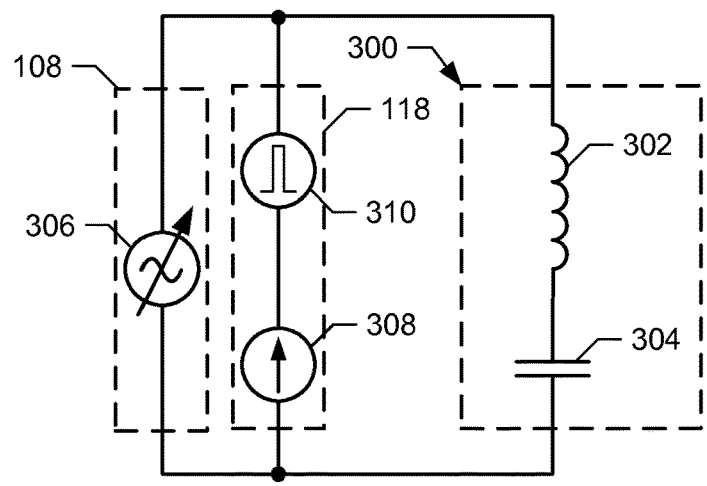
FIG. 3 is a schematic diagram illustrating an example control signal, example vibration mode(s), and a circuit diagram of an example filter that may be used to implement the damping filters of FIGS. 1 and/or 2.
Figure 4:
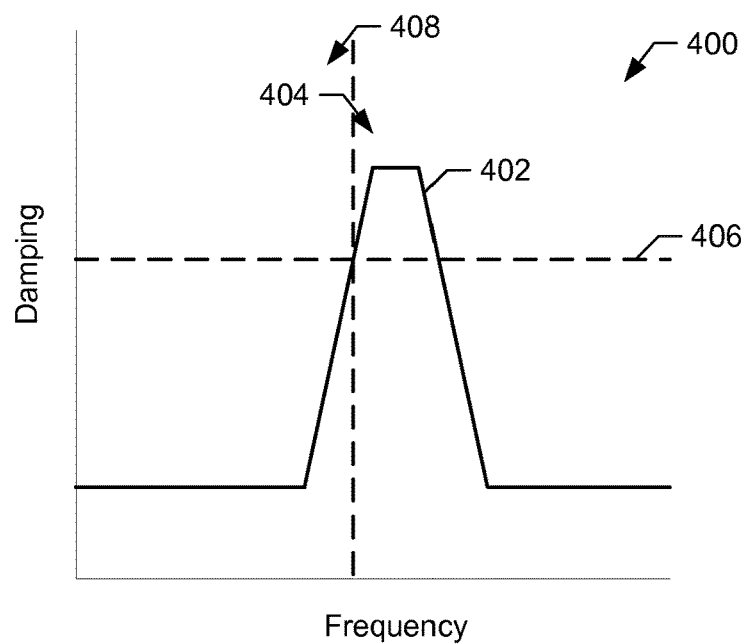
FIG. 4 is a graph showing the frequency response of damping for the example filter of FIG. 3.

FIG. 3 is a circuit diagram of an example filter 300 that may be used to implement the damping filter 120 of FIGS. 1 and/or 2. FIG. 4 is a graph 400 showing the frequency response 402 of damping for the example filter 300 of FIG. 3. The example filter 300 is a passive series resonance circuit having an inductive component (e.g., an inductor 302) and a capacitive component (e.g., a capacitor 304). As illustrated in FIG. 4, the frequency response 402 of the filter 300 results in higher damping for a particular band 404 of frequencies (e.g., a frequency band above an effective damping threshold 406). The inductance value of the example inductor 302 and/or the capacitance value of the example capacitor 304 may be configured to set the frequency range (e.g., center and/or cutoff frequencies) of the band 404.

As illustrated in FIG. 3, the example control signal 108 is modeled as an adjustable alternating current (AC) signal 306. The example AC signal 306 includes frequencies with a control frequency range 408 illustrated in FIG. 4. In contrast, the example vibration mode(s) 118 are modeled in FIG. 3 as a current 308 and/or a pulse signal 310. The vibration mode(s) 118 may be modeled using other type(s) and/or combination(s) of signals. The current 308 and/or the pulse signal 310 include frequencies that are within the example band 404. Thus, the example filter 300 of FIG. 3 enables damping of the signals 308, 310 making up the vibration mode(s) 118 and does not enable damping of the AC signal(s) 306 making up the control signal 108.

Figure 5:
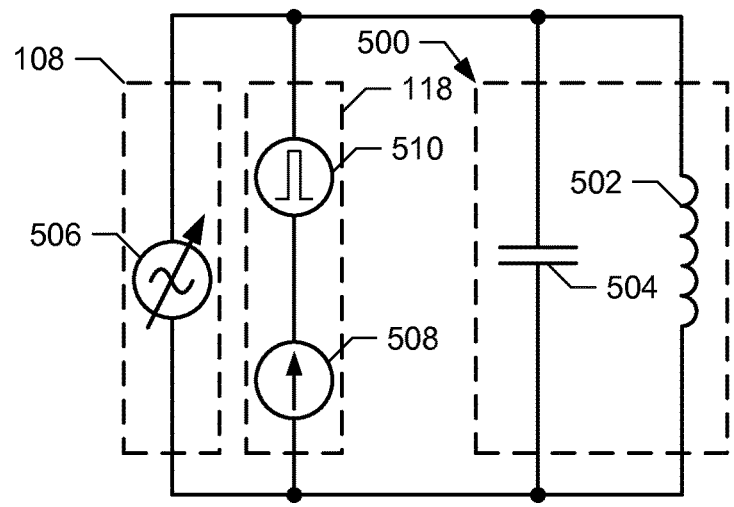
FIG. 5 is a schematic diagram illustrating an example control signal, example vibration mode(s), and a circuit diagram of another example filter that may be used to implement the damping filters of FIGS. 1 and/or 2.
Figure 6:
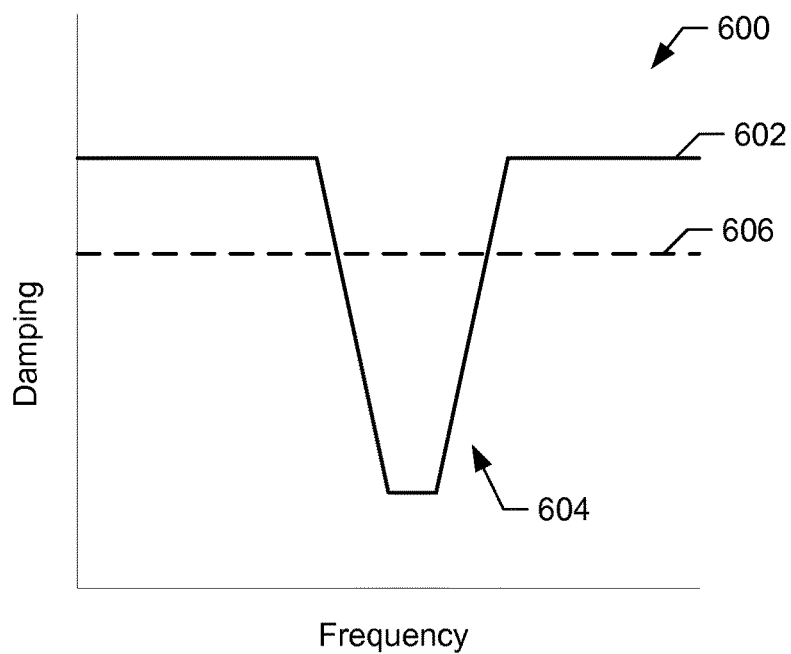
FIG. 6 is a graph showing the frequency response of damping for the example filter of FIG. 5.

FIG. 5 is a circuit diagram of another example filter 500 that may be used to implement the damping filter 120 of FIGS. 1 and/or 2. FIG. 6 is a graph 600 showing the frequency response 602 of damping for the example filter 500 of FIG. 5. The example filter 500 is a passive parallel resonance circuit, having an inductive component (e.g., an inductor 502) and a capacitive component (e.g., a capacitor 504). As illustrated in FIG. 6, the frequency response 602 of the filter 500 results in not enabling damping for a particular band 604 of frequencies (e.g., a frequency band above an effective damping threshold 606). The inductance value of the example inductor 502 and/or the capacitance value of the example capacitor 504 may be configured to set the frequency range (e.g., center and/or cutoff frequencies) of the band 604.

As illustrated in FIG. 5, the example control signal 108 is modeled as an adjustable alternating current (AC) signal 506. The example AC signal 506 includes frequencies within the frequency range 604 (e.g., a control frequency range) illustrated in FIG. 6. In contrast, the example vibration mode(s) 118 are modeled in FIG. 5 as a current 508 and/or a pulse signal 510. The vibration mode(s) 118 may be modeled using other type(s) and/or combination(s) of signals. The current 508 and/or the pulse signal 510 include frequencies that are outside of the example band 604. Thus, the example filter 500 of FIG. 5 enables damping of the signals 508, 510 making up the vibration mode(s) 118 and does not enable damping of the AC signal(s) 506 making up the control signal 108.

Figure 7:
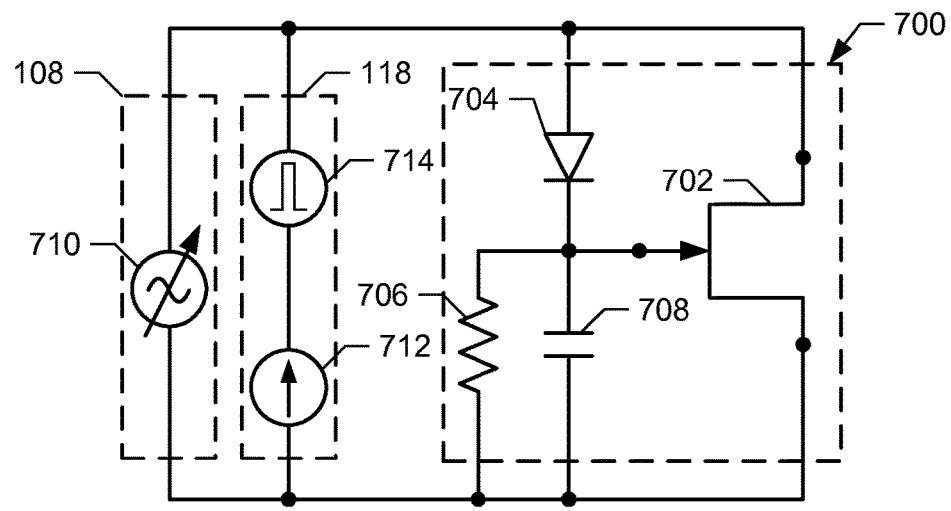
FIG. 7 is a schematic diagram illustrating an example control signal, example vibration mode(s), and a circuit diagram of another example filter that may be used to implement the damping filters of FIGS. 1 and/or 2.
Figure 8:
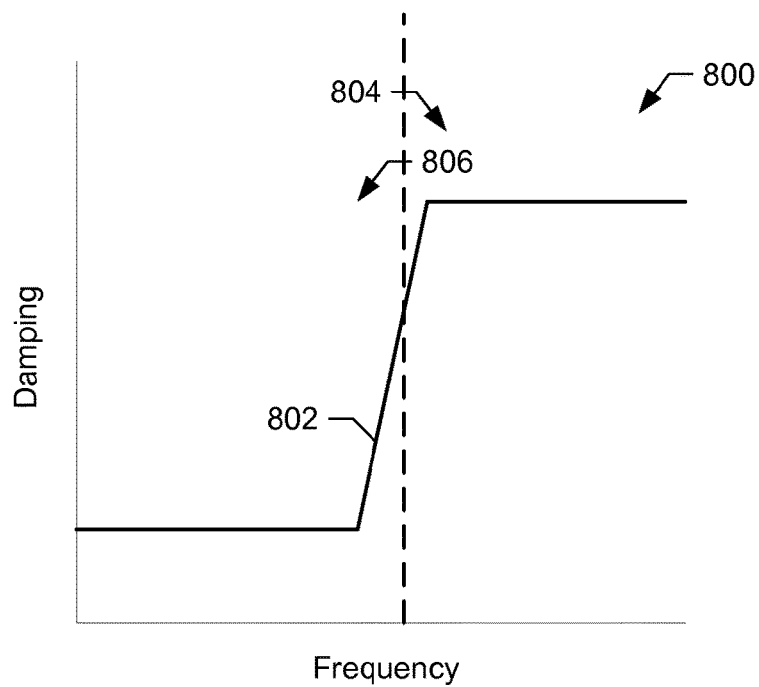
FIG. 8 is a graph showing the frequency response of damping for the example filter of FIG. 7.

FIG. 7 is a circuit diagram of an example filter 700 that may be used to implement the damping filter 120 of FIGS. 1 and/or 2. FIG. 8 is a graph 800 showing the frequency response 802 of damping for the example filter 700 of FIG. 7. The example filter 700 is a triggering circuit that provides a relatively rapid onset of high damping when, for example, the vibration mode 118 is sufficiently large so as to trigger the filter 700.

The example filter 700 of FIG. 7 includes a switching element (e.g., an n-channel junction field effect transistor (JFET) 702), a current directing element (e.g., a diode 704), a resistive element (e.g., a resistor 706), and a capacitive element (e.g., the capacitor 708). The resistor 706 and the capacitor 708 cause the JFET 702 to remain in an open state (e.g., not conducting) during normal operation. The control signals 108 do not trigger a change of the example JFET 702 to a closed state. However, when a sufficiently strong vibration occurs, the JFET 702 is closed by the rise in current caused by the vibration. This enables the shorting coil (e.g., the shorting coil 214 of FIG. 2) to damp signals while the vibration is present (e.g., while the JFET 702 remains closed).

In the example of FIG. 7, the filter 700 permits the shorting coil 214 of FIG. 2 to damp signals at any frequency the shorting coil 214 is capable of damping. In this aspect, the damping permitted by the filter 700 is less frequency selective than the example filters 300 and 500 of FIGS. 3 and/or 5. However, the filter 700 is not triggered (e.g., does not enable damping) unless a signal has a sufficiently high frequency and strength. Therefore, the example filter 700 may be tuned (e.g., by configuring the capacitance of the capacitor 708 and/or configuring the resistance of the resistor 706) to enable damping only when a sufficiently strong vibration mode 118 is input to the system (e.g., the actuator 202 of FIG. 2), where the vibration mode 118 has a frequency (e.g., in a frequency range 804) greater than most or any of the control frequencies.

In other words, the example damping filter 700 does not damp control signal frequencies during a first (e.g., steady) state. The damping filter 700 damps both control signal frequencies and non-control signal frequencies when the damping filter 700 is triggered into a second (e.g., transient) state by an electrical signal (e.g., a vibration mode 118) at a non-control signal frequency (e.g., a frequency above the control signal frequency range).

As illustrated in FIG. 7, the example control signal 108 is modeled as an adjustable alternating current (AC) signal 710. The example AC signal 710 includes frequencies within a frequency range 806 (e.g., a control frequency range) illustrated in FIG. 8. In contrast, the example vibration mode(s) 118 are modeled in FIG. 7 as a current 712 and/or a pulse signal 714. The vibration mode(s) 118 may be modeled using other type(s) and/or combination(s) of signals. The current 712 and/or the pulse signal 714 include frequencies that are in the example range 804 of FIG. 8. Thus, the example filter 700 of FIG. 7 enables damping in response to the signal(s) 712 and/or 714 making up the vibration mode(s) 118 (e.g., the frequencies in the range 804 but not the frequencies in the range 806) reaching a threshold.

Figure 9:
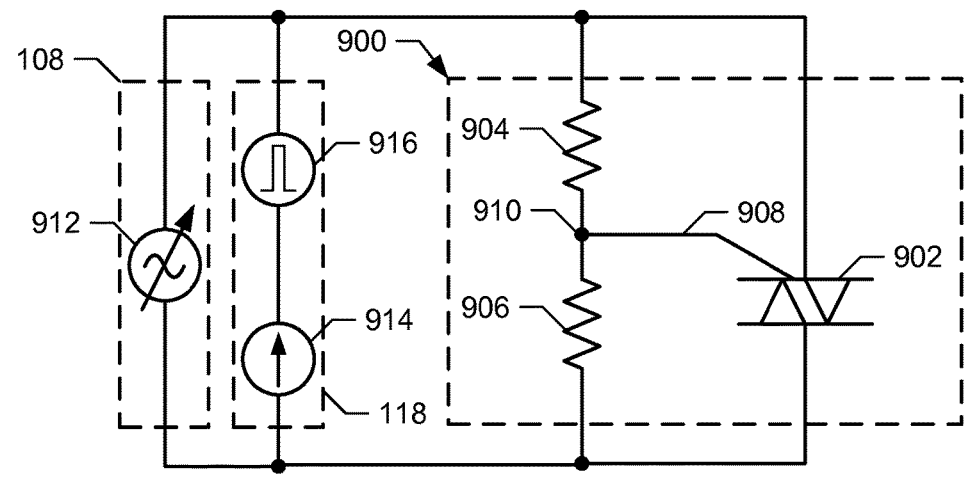
FIG. 9 is a schematic diagram illustrating an example control signal, example vibration mode(s), and a circuit diagram of another example filter that may be used to implement the damping filters of FIGS. 1 and/or 2.
Figure 10:
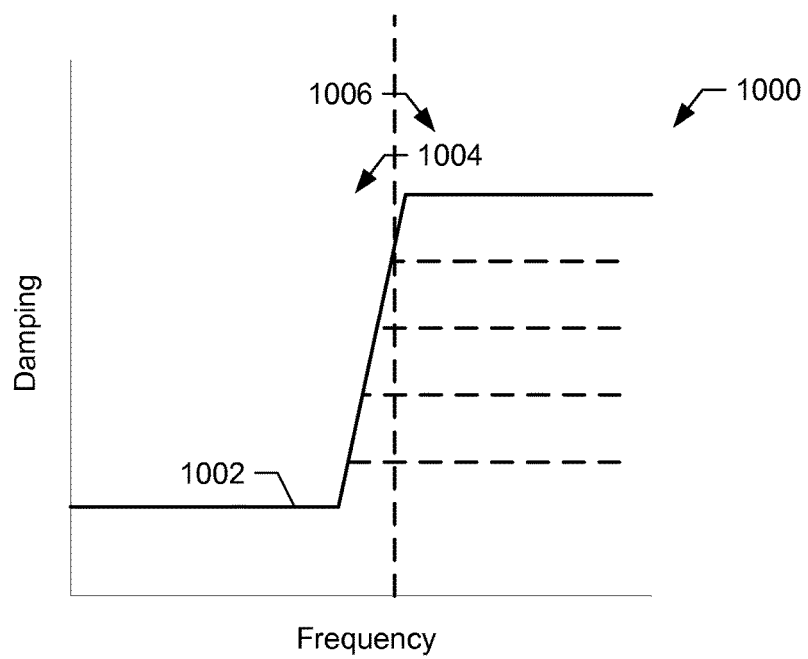
FIG. 10 is a graph showing the frequency response of damping for the example filter of FIG. 9.

FIG. 9 is a circuit diagram of an example filter 900 that may be used to implement the damping filter 120 of FIGS. 1 and/or 2. FIG. 10 is a graph 1000 showing the frequency response 1002 of damping for the example filter 900 of FIG. 9. Like the example filter 700 of FIG. 7, the filter 900 is a triggering circuit that provides a rapid onset of high damping by a shorting coil (e.g., the shorting coil 214 of FIG. 2).

The example filter 900 of FIG. 9 includes a switching element (e.g., a triac 902) and resistive elements (e.g., resistors 904, 906). The resistors 904, 906 are configured in series, and the example triac 902 is in parallel with the resistors 904, 906. The triac 902 includes a gate terminal 908 that is coupled to a node 910 between the resistors 904, 906. The gate terminal 908 of the triac 902 enables current flow through the triac 902 when the voltage at the gate terminal 908 sufficiently increases (e.g., when a vibration mode is sufficiently strong). When the triac 902 is enabled (e.g., closed), the triac 902 is not disabled until the current through the triac 902 decreases below a threshold. While the triac 902 is enabled, the filter 900 enables damping via the shorting coil 214 of FIG. 2.

As illustrated in FIG. 10, the level of damping enabled by the filter 900 may be configured. For example, the damping enabled by the filter 900 may be configured by changing the resistance value(s) of one or both of the resistors 904, 906. For example, increasing the resistance of both resistors 904, 906 increases a threshold strength of a vibration mode (e.g., the vibration 118) to enable the triac 902. Conversely, decreasing the resistance of both resistors 904, 906 decreases the threshold strength of the vibration mode 118 to enable the triac 902. The resistance values of the resistors 904, 906 may also be adjusted relative to each other to achieve a particular turn-on voltage for the triac 902.

Additionally or alternatively, the example triac 902 may be selected to have particular specifications, such as a particular turn-on current or capacitance value. The inherent capacitance of the triac 902 may be selected to set (e.g., approximate) a frequency range or threshold of signals capable of enabling the triac 902.

As illustrated in FIG. 9, the example control signal 108 is modeled as an adjustable alternating current (AC) signal 912. The example AC signal 912 includes frequencies within a frequency range 1004 (e.g., a control frequency range) illustrated in FIG. 10. In contrast, the example vibration mode(s) 118 are modeled in FIG. 9 as a current 914 and/or a pulse signal 916. The vibration mode(s) 118 may be modeled using other type(s) and/or combination(s) of signals. The current 914 and/or the pulse signal 916 include frequencies that are in the example range 1006 of FIG. 10 (e.g., outside of the control frequency range 1004). Thus, the example filter 900 of FIG. 9 enables damping in response to the signal(s) 914 and/or 916 making up the vibration mode(s) 118 (e.g., the frequencies in the range 1006 but not the frequencies in the range 1004) reaching a threshold.

While example damping filters and their corresponding frequency responses are disclosed in FIGS. 3-10, other damping filter configurations may be used instead. The damping filter configuration may be based on the control signal frequencies and/or energies, observed and/or expected vibration modes, and/or other considerations. The example damping filters described above with reference to FIGS. 3-10 enable damping without requiring an external power source. Instead, the example damping filters use electrical, magnetic, and/or mechanical energy present in the shorting coil and/or the electromechanical device to enable damping.

Figure 11:
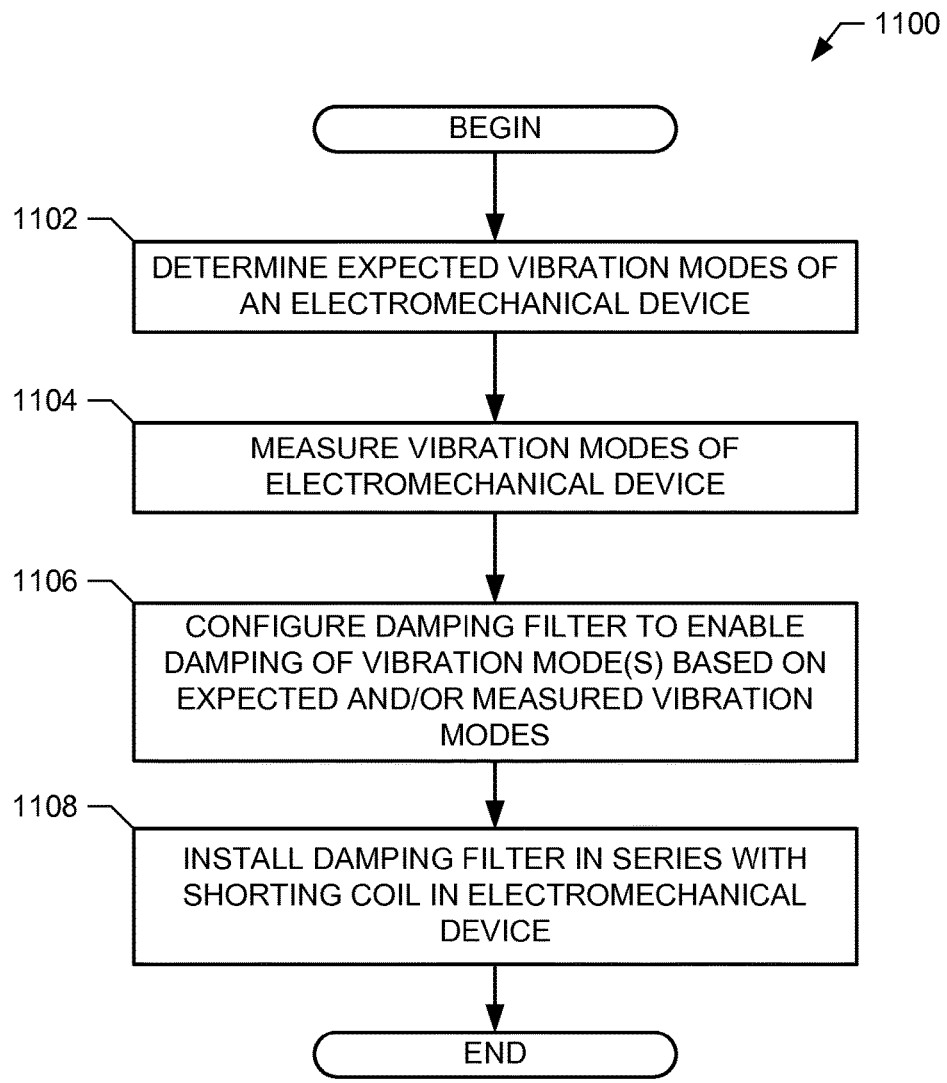
FIG. 11 is a flowchart representative of an example method to provide an electromechanical device with a damping filter.

FIG. 11 is a flowchart representative of an example method 1100 to provide an electromechanical device with a damping filter. The example method 1100 may be used to provide the example system 100 and/or the example electromechanical device 102 of FIGS. 1 and/or 2 with any of the damping filters 120, 300, 500, 700, 900 of FIGS. 1-10.

The example method 1100 of FIG. 11 begins (block 1102) by determining expected vibration modes (e.g., vibration 118) of an electromechanical device (e.g., the electromechanical device 102 of FIGS. 1 and/or 2). The expected vibration modes may be determined by, for example, simulation of operation of the electromechanical device 102, observing similar and/or identical electromechanical devices in similar and/or identical operational situations, calculating the vibration mode(s) 118 based on a design of the electromechanical device 102, and/or any other method of predicting or determining expected vibration modes 118.

The vibration mode(s) 118 of the electromechanical device 102 are measured (block 1104). For example, the vibration 118 of the electromechanical device 102 of FIG. 1 may be measured during in situ operation of the electromechanical device 102.

A damping filter (e.g., the damping filter 120 of FIGS. 1 and/or 2) is configured (block 1106) to enable damping of the vibration mode(s) 118 based on the expected (block 1102) and/or the measured (block 1104) vibration mode(s) 118. The configuration of the damping filter 120 may include consideration of shorting coil characteristics and/or other design considerations.

The configured damping filter 120 is installed in series with a shorting coil (e.g., the shorting coil 214 of FIG. 2) in the electromechanical device 102 of FIG. 1 (block 1108). For example, the damping filter 120 of FIGS. 1 and 2 and the shorting coil 214 of FIG. 2 may be electrically coupled between a control signal 108 and a feedback signal 116 and/or between terminals of the electromechanical device (e.g., the terminals 218, 220 of the actuator 202 of FIG. 2). The installation may occur during manufacture, service, and/or maintenance of the example electromechanical device 102.

Figure 12:
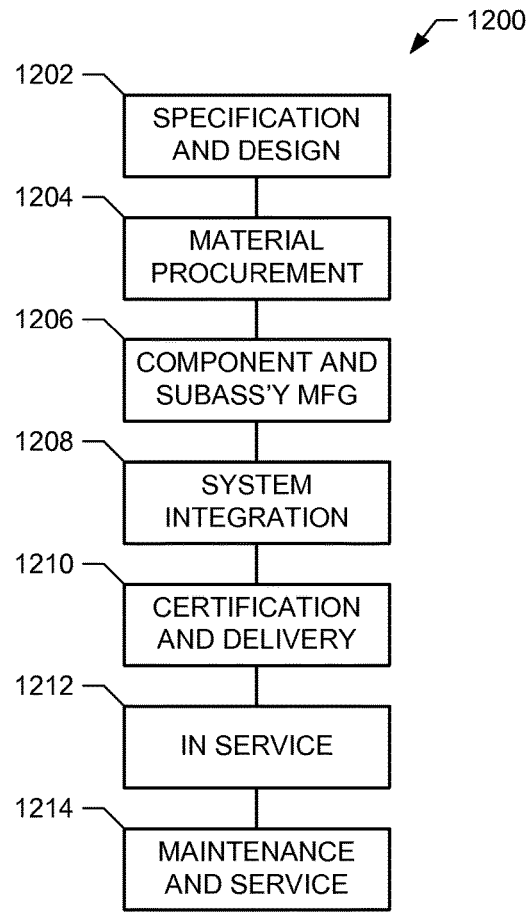
FIG. 12 is a flowchart of vehicle production and service methodology.
Figure 13:
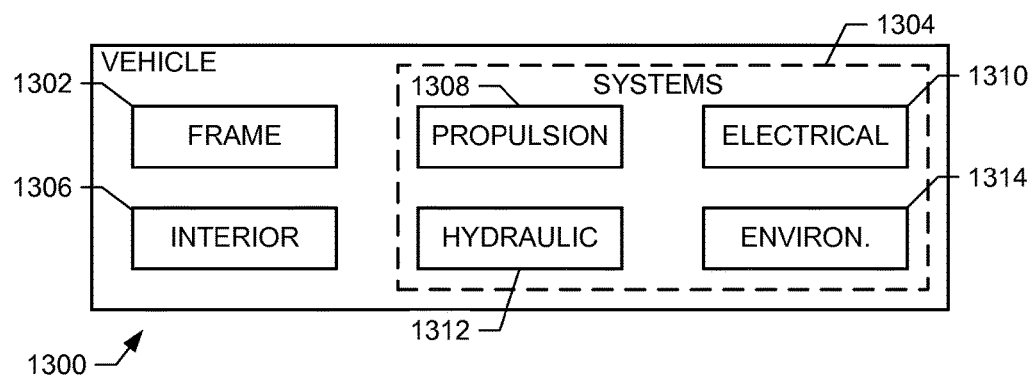
FIG. 13 is a block diagram of a vehicle.

Embodiments of the disclosure may be described in the context of a vehicle manufacturing and service method 1200 as shown in FIG. 12 and a vehicle 1300, such as an aircraft, as shown in FIG. 13. During pre-production, example method 1200 may include specification and design (block 1202) of the vehicle 1300 (e.g., an aircraft) and material procurement (block 1204). During production, component and subassembly manufacturing (block 1206) and system integration (block 1208) of the vehicle 1300 (e.g., an aircraft) takes place. Thereafter, the vehicle 1300 (e.g., an aircraft) may go through certification and delivery (block 1210) in order to be placed in service (block 1212). While in service by a customer, the vehicle 1300 (e.g., an aircraft) is scheduled for routine maintenance and service (block 1214), which may also include modification, reconfiguration, refurbishment, etc.

Each of the operations of the example method 1200 may be performed or carried out by a system integrator, a third party, and/or an operator (e.g., a customer). For the purposes of this description, a system integrator may include without limitation any number of vehicle (e.g., aircraft) manufacturers and major-system subcontractors; a third party may include without limitation any number of venders, subcontractors, and suppliers; and an operator may be an airline, leasing company, military entity, service organization, and so on.

As shown in FIG. 13, the vehicle 1300 (e.g., aircraft) produced by example method 1200 may include a frame 1302 (e.g., an airframe) with a plurality of systems 1304 and an interior 1306. Examples of high-level systems 1304 include one or more of a propulsion system 1308, an electrical system 1310, a hydraulic system 1312, and an environmental system 1314. The example methods and apparatus disclosed herein may be integrated into any of the frame 1302, the systems 1304-1314, and/or the interior 1306 to, for example, control steering of a landing gear of the vehicle 1300 (e.g., aircraft). Any number of other systems may be included. Although an aerospace example is shown, the principles disclosed herein may be applied to other industries, such as the automotive industry.

Apparatus and methods embodied herein may be employed during any one or more of the stages of the production and service method 1200. In some examples, apparatus and methods embodied herein provide vibration damping that is tuned during the component or subassembly manufacturing process (block 1206). For example, components or subassemblies corresponding to production process 1208 may be fabricated or manufactured in a manner similar to components or subassemblies produced while the vehicle 1300 (e.g., aircraft) is in service. Also, one or more apparatus embodiments, method embodiments, or a combination thereof may be utilized during the production stages 1208 and 1210, for example, by substantially expediting assembly of or reducing the cost of a vehicle 1300 (e.g., aircraft). Similarly, one or more of apparatus embodiments, method embodiments, or a combination thereof may be utilized while the vehicle 1300 (e.g., aircraft) is in service, for example and without limitation, to maintenance and service 1214. For example, a damping filter (e.g., any of the damping filters 120, 300, 500, 700, 900 of FIGS. 1-10) may be added to and/or modified on a nose gear steering motor or actuator during maintenance and service (block 1214), after one or more vibration modes have been observed and/or characterized. In some example apparatus and methods embodied herein, the damping is modifiable (e.g., by changing a characteristic of one or more components in the damping filter) while the vehicle 1300 (e.g., aircraft) is in service in block 1212.

The above-disclosed apparatus and methods provide efficient vibration and/or noise damping in electromechanical devices. Unlike known methods of suppressing noise, the example apparatus and methods described herein do not necessarily require additional power to be provided. Instead, these apparatus and methods use electrical and/or magnetic energy present in the electromechanical device to provide the damping. Furthermore, disclosed methods and apparatus are significantly less expensive to design, manufacture, and install relative to known methods of vibration or noise suppression. Methods and apparatus disclosed herein may be easily adapted to different types of electromechanical devices.

Although certain example apparatus and methods have been described herein, the scope of coverage of this disclosure is not limited thereto. On the contrary, this disclosure covers all apparatus and methods fairly falling within the scope of the appended claims.

What is claimed is:

1. An apparatus, comprising:
a damping filter to be coupled between terminals of an electromechanical device, the damping filter to enable damping of non-control signal frequencies, and to not enable damping of control signal frequencies, the damping filter to be electrically coupled in series with a shorting coil that provides a shunt path to bypass a winding of the electromechanical device, the shorting coil magnetically coupled to the winding.

2. An apparatus as defined in claim 1, wherein the damping filter has a frequency response to set frequencies at which the shorting coil is to damp the electromechanical device.

3. An apparatus as defined in claim 1, wherein the non-control signal frequencies include vibration modes of the electromechanical device.

4. An apparatus as defined in claim 1, wherein the electromechanical device comprises an actuator.

5. An apparatus as defined in claim 1, wherein the electromechanical device comprises a motor.

6. An apparatus as defined in claim 1, wherein the damping filter comprises a passive series resonant circuit.

7. An apparatus as defined in claim 1, wherein the damping filter is configured to enable damping of a range of non-control frequencies based on a measured vibration mode.

8. An apparatus as defined in claim 1, wherein the damping filter is configured to not enable damping of a range of control frequencies and to enable damping of non-control frequencies higher than the range and lower than the range.

9. An apparatus as defined in claim 1, wherein the damping filter comprises a circuit to provide rapid onset of damping in response to at least a threshold current.

10. An apparatus as defined in claim 1, wherein the damping filter comprises a triggering circuit to enable damping in response to a signal at a non-control signal frequency.

11. A system, comprising:
an electromechanical device;
a control system to control a state of the electromechanical device;
a shorting coil to provide a shunt path to bypass a winding of the electromechanical device to provide a damping response for the electromechanical device, the shorting coil magnetically coupled to the winding; and
a damping filter in series with the shorting coil to control a range of frequencies for the shorting coil damping response.

12. A system as defined in claim 11, wherein the electromechanical device comprises an electromagnetic actuator or an electric motor.

13. A system as defined in claim 11, wherein the damping filter is to not enable damping control signal frequencies during a first state and is to enable damping of control signal frequencies and non-control signal frequencies when the damping filter is triggered into a second state by an electrical signal at a non-control signal frequency.

14. A system as defined in claim 11, wherein the range of frequencies is based on at least one of an expected vibration mode, an expected noise mode, a measured vibration mode, or a measured noise mode.

15. A system as defined in claim 11, wherein the damping filter comprises a passive filter circuit.

16. A method, comprising:
magnetically coupling a shorting coil to a winding of an electromechanical device; and
electrically coupling a passive filter in series with the shorting coil between terminals of the electromechanical device such that the shorting coil and the passive filter provide a shunt path to bypass the winding of the electromechanical device, the passive filter being configured to enable damping of non-control frequencies and to not enable damping of control frequencies of the shorting coil.

17. A method as defined in claim 16, further comprising configuring the passive filter based on measured vibration modes of the electromechanical device.

18. A method as defined in claim 16, further comprising configuring the passive filter based on expected vibration modes of the electromechanical device.

19. A method as defined in claim 16, wherein the passive filter is configured to enable damping in response to detecting energy at non-control frequencies.

* * * * *